US009521484B2

(12) United States Patent
Kim

(10) Patent No.: US 9,521,484 B2

(45) Date of Patent: Dec. 13, 2016

(54) MULTI-BEAM SOUND SYSTEM

(75) Inventor: Se Ung Kim, Seoul (KR)

(73) Assignee: MIGHTYWORKS CO., LTD., Seoul (KR)

( * ) Notice: Subject to any disclaimer, the term of this patent is extended or adjusted under 35 U.S.C. 154(b) by 698 days.

(21) Appl. No.: 13/881,847

(22) PCT Filed: Oct. 31, 2011

(86) PCT No.: PCT/KR2011/008213
§ 371 (c)(1),
(2), (4) Date: Apr. 26, 2013

(87) PCT Pub. No.: WO2012/057589
PCT Pub. Date: May 3, 2012

(65) Prior Publication Data

US 2013/0216064 A1 Aug. 22, 2013

(30) Foreign Application Priority Data

Oct. 29, 2010 (KR) ........................ 10-2010-0106625

(51) Int. Cl.
*H04R 3/00* (2006.01)
*H04B 1/00* (2006.01)
*H04R 1/40* (2006.01)

(52) U.S. Cl.
CPC ................ *H04R 3/00* (2013.01); *H04R 3/005* (2013.01); *H04R 1/406* (2013.01);
(Continued)

(58) Field of Classification Search
CPC ........... H04R 3/00; H04R 3/005; H04R 1/406; H04R 2201/403; H04R 2430/25; H04R 2499/13
(Continued)

(56) References Cited

U.S. PATENT DOCUMENTS 6,748,086 B1 * 6/2004 Venkatesh ............. H04M 9/082
381/71.4
8,116,478 B2 2/2012 Kim et al.
(Continued)

FOREIGN PATENT DOCUMENTS

JP 2008304498 12/2008
KR 1020040079085 9/2004
(Continued)

OTHER PUBLICATIONS

International Search Report—PCT/KR2011/008213 dated Apr. 4, 2012.

*Primary Examiner* — Vivian Chin
*Assistant Examiner* — Douglas Suthers
(74) *Attorney, Agent, or Firm* — Knobbe Martens Olson & Bear LLP

(57) ABSTRACT

A multi-beam sound system includes a fixed beamforming section which steers the input signal inputted from the microphone array to an intended direction, a blocking matrix which receives the input signal and acquires a noise reference signal from the input signal, a variable beamforming section which acquires an adaptive noise signal from the noise reference signal outputted from the blocking matrix, and a generalized sidelobe canceller (GSC) which includes canceling means for outputting an object signal from the input signal outputted from the fixed beamforming section by removing the adaptive noise signal from the input signal. The fixed beamforming section steers the input signal in at least two directions.

8 Claims, 7 Drawing Sheets

(52) U.S. Cl.
CPC .... *H04R 2201/403* (2013.01); *H04R 2430/25* (2013.01); *H04R 2499/13* (2013.01)

(58) Field of Classification Search
USPC ...................................................... 381/92, 86
See application file for complete search history.

(56) References Cited

U.S. PATENT DOCUMENTS

| | | | | |
|---|---|---|---|---|
| 2004/0175006 | A1 | 9/2004 | Kim et al. | |
| 2006/0182291 | A1* | 8/2006 | Kunieda ................. | G10L 15/00 381/110 |
| 2007/0280486 | A1* | 12/2007 | Buck ...................... | H04R 27/00 381/92 |

FOREIGN PATENT DOCUMENTS

| | | |
|---|---|---|
| KR | 1020080073936 | 8/2008 |
| KR | 1020080087939 | 10/2008 |

* cited by examiner

MULTI-BEAM SOUND SYSTEM

TECHNICAL FIELD

The present invention relates to a system which can provide a sound solution using a microphone array which is set to form a plurality of beams. More particularly, the present invention relates to a multi-beam sound system which is disposed inside a vehicle such that it can provide an efficient sound solution inside the vehicle.

BACKGROUND ART

Recently, in response to the development of a variety of technologies such as Bluetooth, in-vehicle sound solutions (e.g. a voice call solution) have become convenient and are being actively used. However, the call quality of such solutions has not reached the level of call quality obtained from using a typical mobile phone and their environment is inferior, since there are several problems such as noise inside a driving vehicle and echo caused by the use of a speaker. In addition, as voice recognition becomes more common, it is expected that a speech recognition success rate of considerable level be guaranteed inside the vehicle.

For in-vehicle calling and speech recognition, a voice signal must be inputted first using a microphone. In this case, when the voice signal is inputted using only a single microphone, a sufficient signal noise ratio (SNR) of the signal is not ensured. In addition, the voice signal is very vulnerable to acoustic interference, such as driving noise and distortion and echo caused by the space of the vehicle, which is problematic.

In addition, a sound solution for in-vehicle calling or speech recognition is required to receive voices of the driver as well as voices of other persons. As for this problem, the input SNR can be improved and made robust against sound interference signals by forming a beam using a microphone array.

As an approach for forming such a beam, techniques for an adaptive beamformer are disclosed. Among these techniques, a linearly constrained minimum variance (LCMV) adaptive beamformer was disclosed in the report of Otis Lamont Frost III in 1972.

The adaptive beamformer is frequently used for in-vehicle sound solutions. The adaptive beamformer is generally used to provide a more efficiently sound solution inside a vehicle by adaptively changing the direction of a beam in response to a sound source (e.g. a speaker) or a noise.

However, even though the beam is formed using the adaptive beamformer of the related art, there is a problem in that it is difficult for the microphone array using one beam to receive voices of several persons or the performance thereof is low.

For this, a microphone array system having two or more beams can be required. Since various noises and interference signals are present, the difference in steering between an interference signal and a desired signal can also be decreased, thereby requiring beamforming to be more precise.

DISCLOSURE

Technical Problem

Therefore, an object of the present invention is to provide a microphone array which can form a multiplicity of beams and an adaptive beamformer for the microphone array.

Also provided is a multi-beam sound system which is more robust in the in-vehicle environment as described above, and to which an adaptive algorithm is applied for this purpose.

Also provided is a beamformer which uses a self-tuning algorithm having a relatively small amount of computation and is robust against non-stationary interference signals and echo.

Technical Solution

According to an aspect of the invention for realizing the foregoing object, provided is a multi-beam sound system that includes a microphone array disposed at a predetermined position inside a vehicle, the microphone array comprising a plurality of microphones, and receiving an input signal; and an adaptive beamformer which forms beams of the microphone array. The adaptive beamformer forms at least two beams of the microphone array in different directions The beamformer may include a fixed beamforming section which steers the input signal inputted from the microphone array to an intended direction; a blocking matrix which receives the input signal and acquires a noise reference signal from the input signal; a variable beamforming section which acquires an adaptive noise signal from the noise reference signal outputted from the blocking matrix; and a generalized sidelobe canceller (GSC) which includes canceling means for outputting an object signal from the input signal outputted from the fixed beamforming section by removing the adaptive noise signal from the input signal. The fixed beamforming section steers the input signal in at least two directions.

The generalized sidelobe canceller (GSC) may be designed under constraints according to a following formula in order to steer the input signal in at least two directions:

$$[C_1 \ C_2 \ \dots \ C_N]^H \underline{w} = \underline{f}$$

$$C_i = \begin{bmatrix} \underline{a}(\theta_i) & \underline{0} & \dots & \underline{0} \\ \underline{0} & \underline{a}(\theta_i) & \dots & \underline{0} \\ \vdots & \vdots & \ddots & \vdots \\ \underline{0} & \underline{0} & \dots & \underline{a}(\theta_i) \end{bmatrix}, i = 1, \dots, N,$$

where $C_i$ indicates an $i^{th}$ constraint matrix, $\underline{a}(\theta_i)$ indicates a steering vector, $\underline{w}$ is a weight vector matrix, and $\underline{f}$ indicates an impulse response that is intended.

The variable beamforming section may acquire the adaptive noise signal using a self-tuning recursive least squares (RLS) algorithm.

The microphone array may be disposed at a predetermined position corresponding to two seats from among seats provided inside the vehicle. The predetermined position may be situated at a predetermined point between the two seats on a line orthogonal to a direction of the two seats, at least one of the at least two beams may be formed in a direction facing toward a seat which is positioned on one side with respect to the orthogonal line, and the other at least one of the at least two beams may be formed in a direction facing toward a seat which is positioned on the other side with respect to the orthogonal line.

The multi-beam sound system may further include an echo remover which removes an echo signal from the input signal when the echo signal based on a sound signal outputted from an audio-video-navigation (AVN) device of the vehicle is included in the input signal.

The echo remover may receive information about the sound signal from the audio-video-navigation (AVN) device, store the received information about the sound signal, estimate the echo signal based on the stored information about the sound signal, and remove the estimated echo signal from the input signal.

The multi-beam sound system may further include a second microphone array which is disposed so as to correspond to at least one seat from among the seats provided inside the vehicle except for the two seats.

The multi-beam sound system may further include a second adaptive beamformer, wherein the adaptive beamformer or the second adaptive beamformer forms at least one beam of the second microphone array.

According to another aspect of the invention for realizing the foregoing object, provided is a multi-beam sound system that includes: an adaptive beamformer which forms beams of a microphone array, the microphone array being disposed at a predetermined position inside a vehicle, comprising a plurality of microphones, and receiving an input signal; and an echo remover which removes an echo signal from an output signal outputted from the microphone array, the echo signal being based on a sound signal outputted from an audio-video-navigation (AVN) device of the vehicle. The adaptive beamformer forms at least two beams of the microphone array.

The input signal may include a speaker signal or a voice command signal of an occupant inside the vehicle. The multi-beam sound system may output an echo-removed speaker signal or an echo-removed voice command signal to the audio-video-navigation (AVN) device by removing the echo signal from the speaker signal or the voice command signal inputted through at least one beam of the at least two beams. The audio-video-navigation (AVN) device may transmit the echo-removed speaker signal to a counterpart communication device or outputs a control signal for controlling a predetermined device of the vehicle in response to the echo-removed voice command signal.

According to a further aspect of the invention for realizing the foregoing object, provided is a multi-beam sound system that includes: a fixed beamforming section which steers the input signal inputted from the microphone array to an intended direction; a blocking matrix which receives the input signal and acquires a noise reference signal from the input signal; a variable beamforming section which acquires an adaptive noise signal from the noise reference signal outputted from the blocking matrix; and a generalized sidelobe canceller (GSC) which includes canceling means for outputting an object signal from the input signal outputted from the fixed beamforming section by removing the adaptive noise signal from the input signal. The fixed beamforming section steers the input signal in at least two directions.

The generalized sidelobe canceller (GSC) may be designed under constraints according to a following formula in order to steer the input signal in at least two directions:

$$[C_1 \;\; C_2 \;\; \ldots \;\; C_N]^H \underline{w} = \underline{f}$$

$$C_i = \begin{bmatrix} \underline{a}(\theta_i) & \underline{0} & \ldots & \underline{0} \\ \underline{0} & \underline{a}(\theta_i) & \ldots & \underline{0} \\ \vdots & \vdots & \ddots & \vdots \\ \underline{0} & \underline{0} & \ldots & \underline{a}(\theta_i) \end{bmatrix}, i = 1, \ldots, N,$$

where $C_i$ indicates an $i^{th}$ constraint matrix, $\underline{a}(\theta_i)$ indicates a steering vector, $\underline{w}$ is a weight vector matrix, and $\underline{f}$ indicates an impulse response that is intended.

Advantageous Effects

Since the multi-beam sound system according to the invention can adaptively form a plurality of beams, there is an effect in that the recognition of a plurality of sound sources can be improved.

In addition, when the multi-beam sound system according to the invention is applied to a vehicle, there is an effect in that not only a voice of the driver but also voices of other passengers can be efficiently received.

Furthermore, the present invention can be robust against noises and echo inside and outside the vehicle. In particular, when the echo remover is provided, there is an effect in that the invention can be more robust against noises and echo.

In addition, there is an effect in that beams robust against non-stationary interference signals and echo can be formed within a relatively short time using the self-tuning algorithm having a relatively small amount of computation.

DESCRIPTION OF DRAWINGS

Brief descriptions of individual figures are given in order to enhance understanding of the drawings which are referred to in the detailed description of the invention.

MODE FOR INVENTION

Figure 1A:
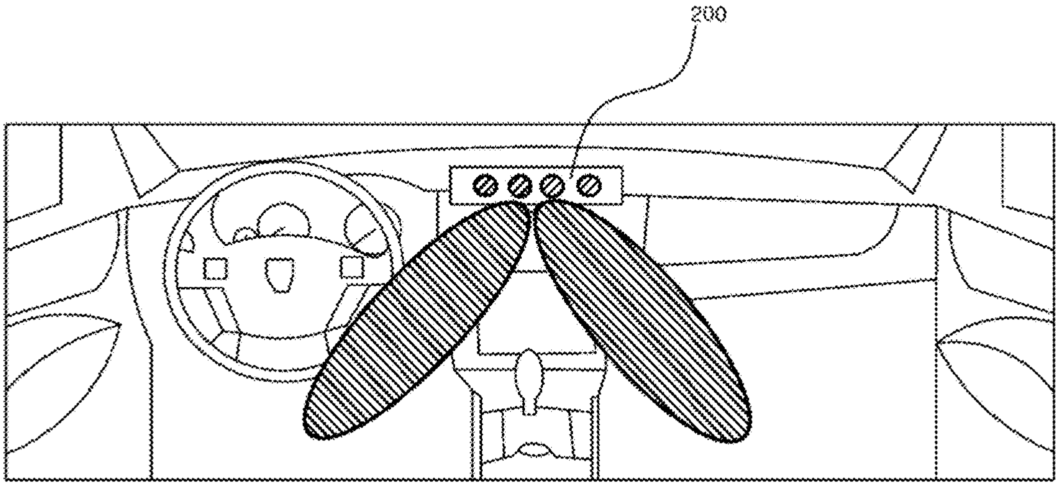
FIGS. 1A, 1B and 1C are a conceptual view showing the case in which a multi-beam sound system according to an embodiment of the invention is disposed inside a vehicle.

The present invention, advantages associated with the operation of the present invention and objects that are realized by the practice of the present invention will be apparent from the accompanying drawings which illustrate exemplary embodiments of the invention and the detailed description of the invention which are illustrated in the drawings.

Throughout the specification, it will be understood that, when an element is referred to as “transmitting” a data to another element, the element not only can directly transmit the data to another element but also indirectly transmit the data to another element via at least one intervening element.

In contrast, when an element is referred to as “directly transmitting” a data to another element, the element can transmit the data to another element without an intervening element.

The present invention will now be described more fully hereinafter with reference to the accompanying drawings, in which exemplary embodiments thereof are shown. Reference should be made to the drawings, in which the same reference numerals are used throughout the different drawings to designate the same or similar components.

Figure 1B:
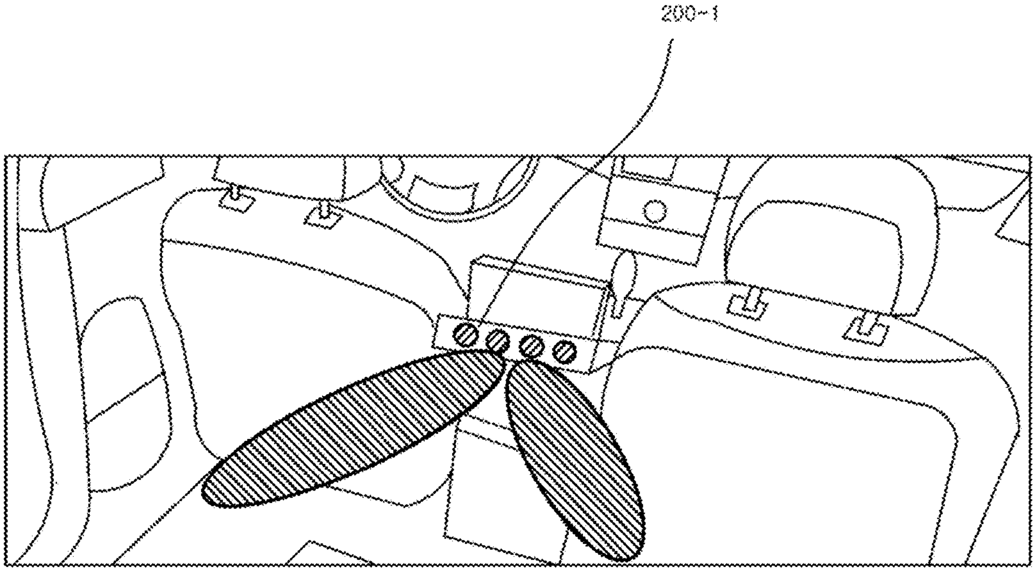
Figure 1C:
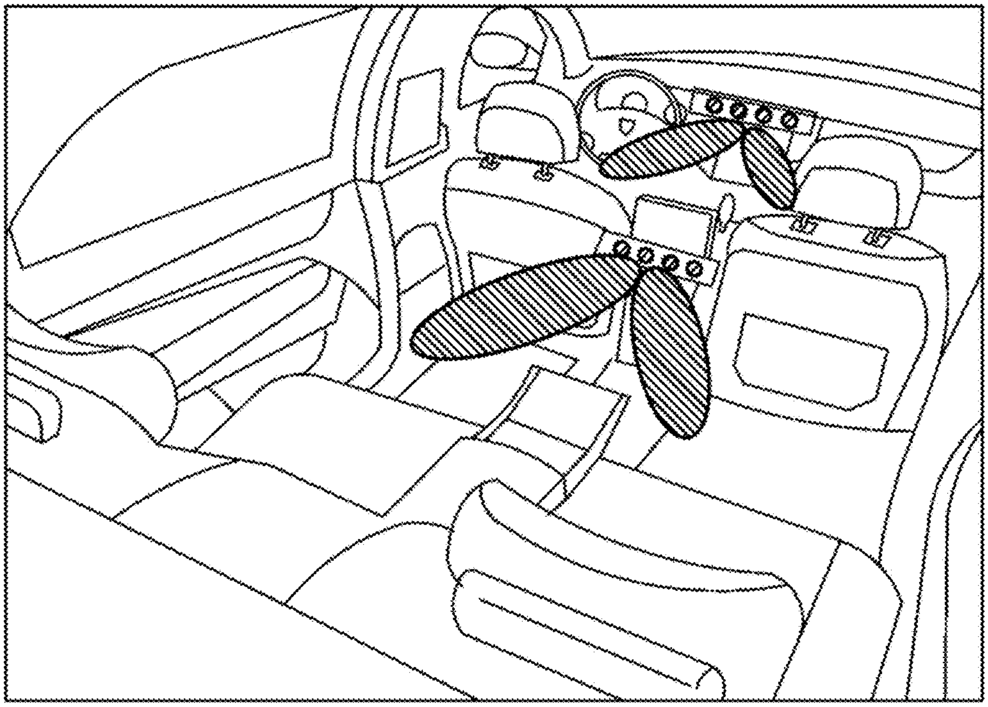
Figure 2:
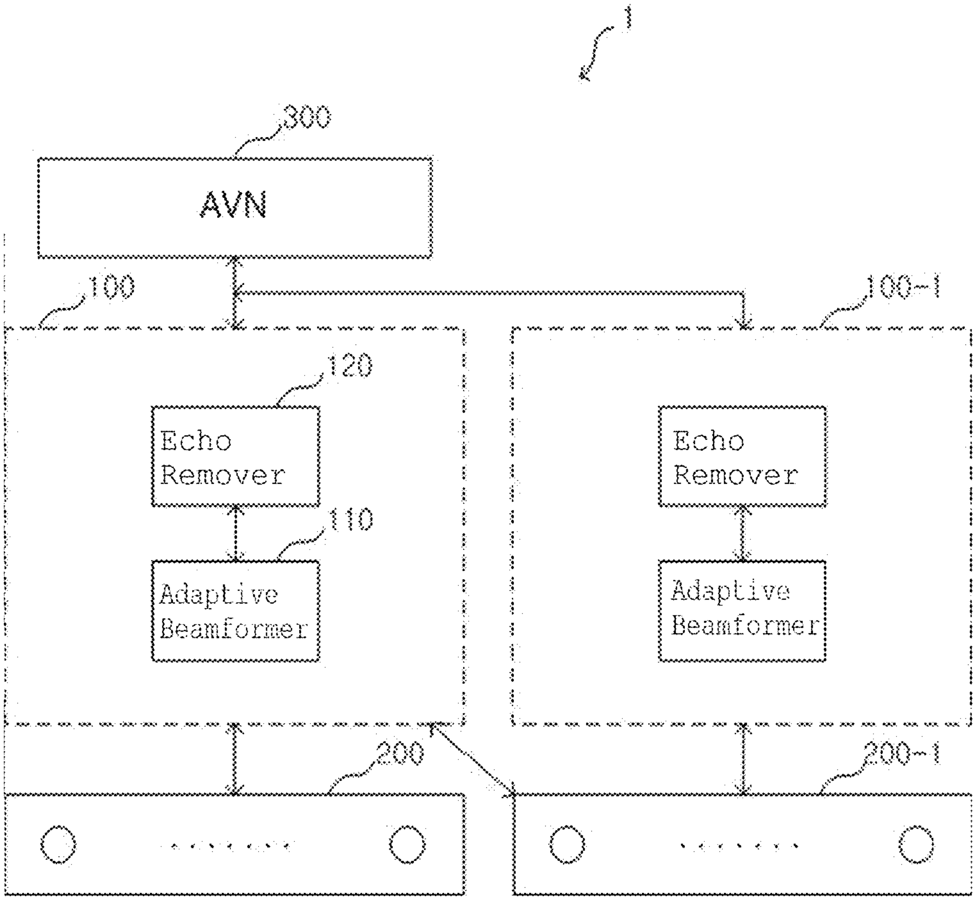
FIG. 2 is a view showing the schematic configuration of the multi-beam sound system according to an embodiment of the invention.

FIGS. 1A, 1B and 1C are a conceptual view showing the case in which a multi-beam sound system according to an embodiment of the invention is disposed inside a vehicle, and FIG. 2 is a view showing the schematic configuration of the multi-beam sound system according to an embodiment of the invention.

First, referring to FIGS. 1A and 2, a microphone array 200 shown in FIG. 1A can be disposed in order to realize the multi-beam sound system according to an embodiment of the invention. As shown in FIG. 1A, the microphone array 200 can form at least two beams. Herein, a beam may indicate a mainlobe that is formed by an adaptive beamformer 110 according to an embodiment of the invention.

In this way, the multi-beam sound system 1 according to an embodiment of the invention can form at least two beams based on the technical principle that will be described later. A plurality of beams can be easily formed in order to receive voice signals not only from the driver of each vehicle but also from a passenger.

The microphone array 200 can be disposed such that it corresponds to a plurality of seats. The configuration in which the microphone array 200 is disposed so as to correspond to the plurality of seats can indicate that the beams are formed in the direction facing toward the positions of the plurality of seats. For example, when the microphone array 200 forms two beams, as shown in FIG. 1A, the two beams can be formed in the directions facing toward the driver's seat and the front seat next to the driver's seat disposed inside the vehicle.

According to an embodiment of the invention, when two beams are formed by the microphone array 200, the two beams can be realized such that they are formed in different directions about the center of the microphone array 200. Forming the beams in different directions like this can have the effect of reducing the influence of interference between the beams.

Therefore, as shown in FIG. 1A, the microphone array 200 can be disposed or buried in a dashboard which is provided for the front seat of the vehicle. The microphone array 200 can form at least two beams in different directions about a normal line at a predetermined point (e.g. the center) thereof. Here, the different directions can be a direction facing toward the driver's seat and a direction facing toward the front seat next to the driver's seat.

Referring to FIG. 1B and FIG. 2, the multi-beam sound system 1 according to an embodiment of the invention can also include a second microphone array 200-1. The second microphone array 200-1 can be disposed in order to receive the voices of passengers who are seated in the rear seats. For this, according to an embodiment of the invention, the second microphone array 200-1 can also be configured such that it forms a plurality of beams. According to implementations, the second microphone array 200-1 can be configured such that it forms one beam and adaptively changes the direction of the beam. This technical idea of changing the direction of one beam depending on the position of a sound source will not be described in detail, since it is well-known in the art.

The second microphone array 200-1 can be disposed or buried at a position where it can easily receive the voices of passengers seated in rear seats. For example, as shown in FIG. 1B, the second microphone array 200-1 can be disposed or buried at a position within a console box which is situated between the driver's seat and the front seat next to the driver's seat. In general, the console box is positioned such that the normal line thereof extends through or around the center of the rear seats. Since the second microphone array 200-1 is disposed at a predetermined position of the console box, it can form at least two beams in different directions about the normal line as described above. Of course, the second microphone array 200-1 is not required to be disposed at a predetermined position within the console box. While the second microphone array 200-1 can be separately disposed in the console box, it can be implemented as a constituent part of a multimedia device for rear seats when the multimedia device is disposed adjacent to the console box or at another position.

FIG. 1C shows the case in which each of the microphone array 200 and the second microphone array 200-1 forms two beams. The beams from the microphone array 200 can be formed so as to face toward the driver's seat and the front seat next to the driver's seat, and the beams from the second microphone array 200-1 can be formed so as to face toward the rear seat behind the driver's seat and the rear seat behind the front seat next to the driver's seat. In this way, the multi-beam sound system 1 according to an embodiment of the invention forms a total of four beams. Accordingly, unlike a traditional in-vehicle sound system, which is typically disposed such that it receives the voice of the driver seated in the driver's seat, the multi-beam sound system 1 can efficiently receive the voices of passengers in the vehicle.

In addition, since a plurality of beams is formed, there is an effect in that the amount of data to be computed in real time is smaller than in the case in which one beam is formed and the direction of the beam is changed in real time.

Referring to FIG. 2, the multi-beam sound system 1 according to an embodiment of the invention can include an adaptive beamformer 110. The adaptive beamformer 110 can be included in a control unit 100. According to implementations, the control unit 100 can also include an echo remover 120, as shown in FIG. 2. The control unit 100 can be implemented as one chip, or as a piece of software that is configured so as to be systemically combined with a predetermined piece of hardware.

The control unit 100 can be connected to a predetermined audio-video-navigation (AVN) unit 300. An output signal from the control unit 100 (e.g. a signal received through the microphone array 200) can be transmitted to a predetermined device (e.g. a counterpart communication device or a device which is intended to execute a voice command) via the AVN unit 300. In addition, the control unit 100 can receive a signal that is to be transmitted from the AVN unit 300 to the outside or a sound signal that is to be outputted through a speaker, and use the received signal. For example, the echo remover 120 included in the control unit 100 can receive information about the signal that is to be transmitted from the AVN unit 300 to the outside or information about the sound signal that is to be outputted into the vehicle, and estimate an echo signal in an input signal inputted from the microphone array 200 using the received information, thereby cancelling the estimated echo signal.

When the multi-beam sound system 1 according to an embodiment of the invention is disposed in the vehicle, the AVN unit 300 can indicate any type of sound system, which is provided in the vehicle, such as an audio system, a video system, a navigation system or a voice call system. In addition, when the multi-beam sound system 1 is used in a place rather than the vehicle, the AVN unit 300 can be used as any type of sound system which can transmit a signal to another device or output a signal received from the outside.

When a sound signal is outputted from a speaker, which is a constituent part of the AVN unit 300, and is inputted again as a part of an input signal that is inputted through the microphone array 200, the echo remover 120 can perform the function of removing an echo signal from the input signal. In other words, the echo remover 120 removes the echo signal from the input signal inputted from the microphone array 200, and the input signal from which the echo signal is removed can be transmitted to the AVN unit 300.

For this, the echo remover 120 can receive information about the sound signal that is (to be) outputted through the speaker from the AVN unit 300, and temporarily store the received information. In addition, the echo signal can be estimated based on the information about the sound signal, and the estimated echo signal can be removed from the input signal inputted through the microphone array 200. In this way, a technical idea of previously storing a signal that is to be outputted through the speaker and removing an echo signal using the stored signal can be used in the echo remover 120. This technical idea is disclosed in a Korean patent application, which was filed by the applicant at Nov. 18, 2009 (Korean Patent Application No. 10-2009-0111323, titled "SIGNAL SEPARATION METHOD, AND COMMUNICATION SYSTEM AND VOICE RECOGNITION SYSTEM USING THE SIGNAL SEPARATION METHOD," hereinafter referred to as "earlier-filed application"). The technical idea and entire contents of the earlier-filed application are incorporated herein by the reference.

The echo remover 120 can separate the echo signal from the input signal in real time within a short time using a modified blind source separation (BSS) algorithm, as disclosed in the earlier-filed application. In addition, according to the modified BSS algorithm disclosed in the earlier-filed application, the two signals can be separated from each other using one microphone. Specifically, when the input signal inputted from the microphone array 200 is outputted as an object signal through the adaptive beamformer 110, the echo remover 120 can remove the echo signal by processing the object signal as an input signal inputted through one microphone, as in the earlier-filed application. Of course, the echo remover 120 can remove the echo by a variety of other known techniques in addition to the technical idea disclosed in the earlier-filed application.

For example, when a voice signal from a driver or passenger in the vehicle is received through at least one of the two beams formed by the microphone array 200, the voice signal can be a speaker signal for calling or a voice command signal for a voice recognition command. Then, the speaker signal or voice command signal can be outputted through the adaptive beamformer 110 to the echo remover 120. An echo signal can be removed from a speaker or voice command signal by the echo remover 120, and the resultant speaker or voice command signal can be outputted to the AVN unit 300. In sequence, the AVN unit 300 can output the speaker signal, from which the echo signal is removed, to a counterpart communication device, or as a control signal for controlling a predetermined device subject to the voice recognition command (e.g., a navigation device, a window of the vehicle, or other devices of the vehicle). When the input signal is the voice recognition command, the control unit 100 and/or the AVN unit 300 can include a voice recognition device (not shown) which recognizes a voice signal and converts the voice signal into a command signal. If the voice recognition device (not shown) is provided as a part of the AVN unit 300, the signal outputted through the echo remover 120 is inputted into the voice recognition device (not shown), which then can generate the control signal based on the input signal, and output the generated control signal to a predetermined device of the vehicle.

In addition, as shown in FIG. 2, the multi-beam sound system 1 can also include the second microphone array 200-1. While the second microphone array 200-1 can be connected to the control unit 100 and carry out the above-described function, it can be connected to a separate second control unit 100-1. The separate second control unit 100-1 can be connected to the AVN unit 300.

The second microphone array 200-1 can form at least one beam, as described above. For example, it can form one beam such that the direction of the beam is adaptively changed depending on the position of a passenger in a rear seat, or form two or more beams that face toward the positions where passengers are to be seated in rear seats.

In addition, the function of the adaptive beamformer 110 will be described with reference to FIG. 3 and FIG. 4.

Figure 3:
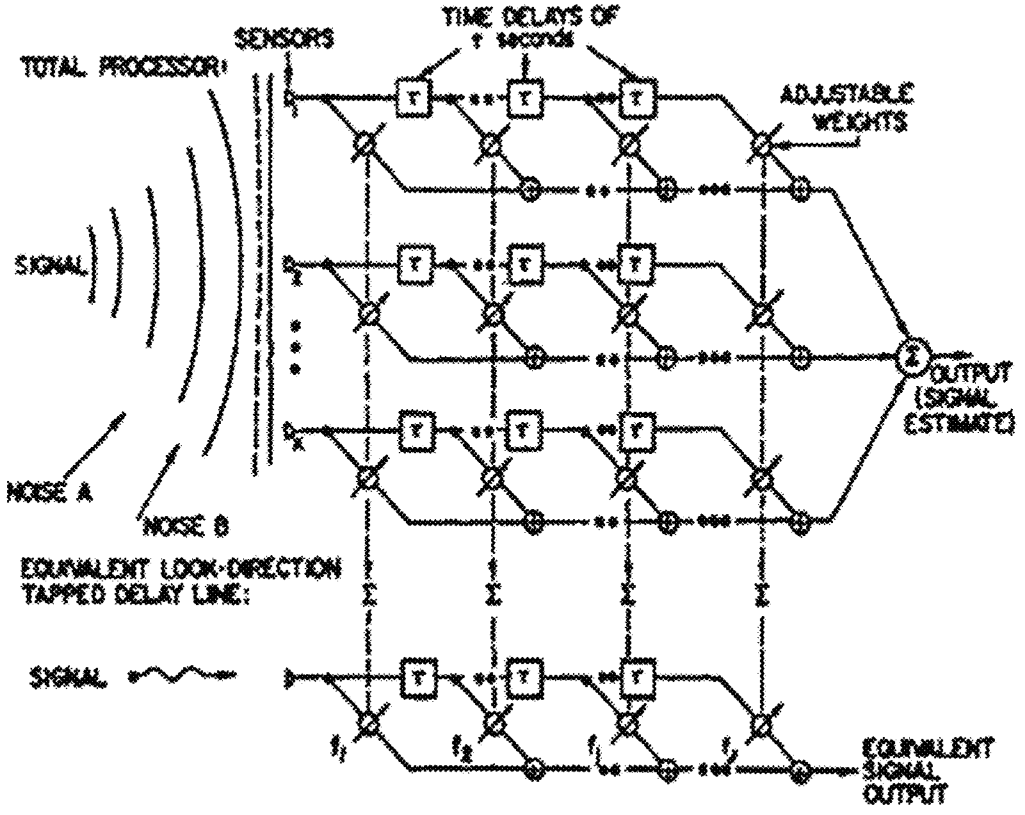
FIG. 3 is a view explaining the concept of a broadband beamformer of a typical multi-beam sound system.
Figure 4:
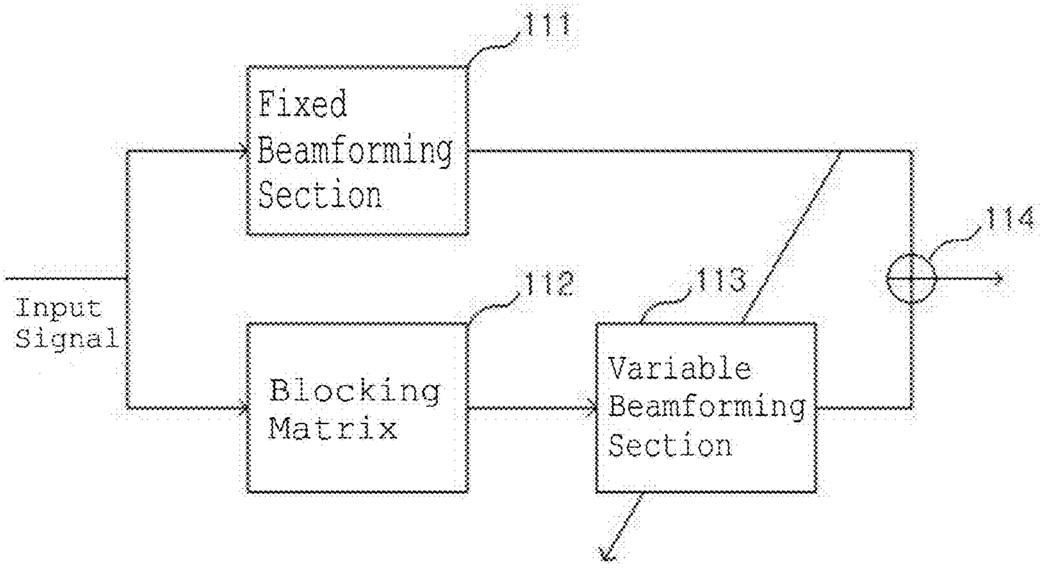
FIG. 4 is a view showing the schematic configuration of the adaptive beamformer according to an embodiment of the invention.

FIG. 3 is a view explaining the concept of a broadband beamformer of a typical multi-beam sound system, and FIG. 4 is a view showing the schematic configuration of the adaptive beamformer according to an embodiment of the invention.

First, referring to FIG. 3, the structure of a broadband linearly constrained minimum variance (LCMV) adaptive beamformer is shown. The broadband LCMV adaptive beamformer can be understood as originating from the report of Otis Lamont Frost III in 1972. As shown in FIG. 3, unlike a narrowband beamformer, the broadband beamformer can be configured as a structure in which several time delay tabs are attached to each sensor (microphone). In addition, when expressed as an equivalent circuit in the look direction, each of the equivalent filter tabs can be expressed by an impulse response of the entire circuit.

It can be assumed that the beamformer shown in FIG. 3 includes a K number of sensors and a J number of delay tabs. In this case, the total number of weights is KJ, and the number of constraints must be J. In addition, output power is minimized using the remaining KJ-J number of degrees of freedom.

Here, an input signal and a weight vector can be defined as follows:

$$X(n)=[\vec{x}(n)^T\vec{x}(n-1)^T \ldots \vec{x}(n-J)^T]^T$$

$$\vec{x}(n)=[x_1(n)x_2(n) \ldots x_K(n)]^T \quad \text{[Formula 1]}$$

$$W(n)=[w_1(n)w_2(n) \ldots w_{KJ}(n)]^T \quad \text{[Formula 2]}$$

Here, n indicates a sample number, $\vec{x}(n)$ indicates an input signal vector, and $W_{KJ}(n)$ indicates a weight vector.

In addition, linear constraints are given as follows:

$$C^TW=F \quad \text{[Formula 3]}$$

In the above formula, F is a desired impulse response, and can indicate a JX1 vector consisting of values from $f_1$ to $f_j$. As shown in FIG. 3, the broadband beamformer can be modeled using an equivalent finite impulse response (FIR) filter. At this time, the impulse response having a desired frequency response can be designed. Therefore, the impulse response F can be a design parameter that determines the frequency characteristic of the beamformer. The constraint matrix C is a matrix having a KJ*J size, and can be defined as Formula 4 below:

$$C=[c_1 \ldots c_j \ldots c_J] \quad \text{[Formula 4]}$$

where, $$c_j=[0_K^T \ldots 0_K^T\vec{a}(\theta)^T0_K^T \ldots 0_K^T]^T$$

In Formula 4 above, $0_K$ indicates a column vector having a length K, $\vec{a}(\theta)$ indicates a steering vector having a length K. Therefore, $C_j$ becomes a column vector having a length KJ, in which a steering vector is present in the $j^{th}$ group, and the other elements are 0.

The typical broadband beamformer of the related art is designed such that it has only one beam, i.e. one mainlobe, in which the constraint matrix can be expressed by the following formula.

$$C = \begin{bmatrix} \underline{a}(\theta) & \underline{0} & \cdots & \underline{0} \\ \underline{0} & \underline{a}(\theta) & \cdots & \underline{0} \\ \vdots & \vdots & \ddots & \vdots \\ \underline{0} & \underline{0} & \cdots & \underline{a}(\theta) \end{bmatrix} \quad \text{[Formula 5]}$$

Here, $\underline{a}(\theta)$ indicates a steering vector in the look direction, in which case the impulse response f indicates a desired response in that direction. In addition, as will be described later, the broadband beamformer can be implemented as a generalized sidelobe canceller (GSC), in which a blocking matrix Ca of the GSC is defined as a null space of C, and its size can be defined as KJ*(K−1)J. In addition, the size of an adaptive weight vector can also be designed to be (K−1)J*1.

The adaptive beamformer 110 according to an embodiment of the invention can also be configured based on the broadband LCMV adaptive beamformer shown in FIG. 3. The adaptive beamformer 110 can be designed such that the impulse response F has a suitable frequency response in the voice band. However, since it is difficult for the broadband beamformer as described above to use a self-tuning adapted algorithm, the adjustment of weights in the beamformer can be realized using a generalized sidelobe canceller (GSC) as shown in FIG. 4.

An orthogonal complement matrix of the constraint matrix C of Formula 3 can be $C_a$. A KJ*KJ matrix U and a KJ*1 vector $\vec{q}$ can be defined as follows:

$$U=[C \vdots C_a] \quad \text{[Formula 6]}$$

$$\vec{q}=U^{-1}\vec{w}=[\vec{v}^T \vdots -\vec{w}_a^T]^T \quad \text{[Formula 7]}$$

According to Formula 6 and Formula 7, the weight vector can be expressed as follows:

$$\vec{w}=U\vec{q}=C\vec{v}-C_a\vec{w}_a \quad \text{[Formula 8]}$$

According to Formula 8 and Formula 3, the following formula can be obtained.

$$C^HC\vec{v}-C^HC_a\vec{w}_a=F \quad \text{[Formula 9]}$$

The definition of the orthogonal complement is arranged to $C^HC_a=0$, and thus Formula 9 can be arranged as follows:

$$\vec{v}=(C^HC)^{-1}F \quad \text{[Formula 10]}$$

A fixed beamformer component of the beamformer can be obtained using Formula 11. This can be expressed by the following formula.

$$\vec{w}_q=Cv\leq C(C^HC)^{-1}F \quad \text{[Formula 11]}$$

According to Formula 8 and Formula 11, the weight vector can be expressed as follows:

$$\vec{w}=\vec{w}_q-C_a\vec{w}_a \quad \text{[Formula 12]}$$

From Formula 12, the GSC can be produced, and the structure of the GSC can be the same as in FIG. 4.

Referring to FIG. 4, the GSC or adaptive beamformer 110 can include a fixed beamforming section 111 which steers an input signal inputted from the microphone array 200 to an intended direction, a blocking matrix 112 which receives the input signal and acquires a noise reference signal from the input signal, a variable beamforming section 113 which acquires an adaptive noise signal from the noise reference signal outputted from the blocking matrix 112, and a generalized sidelobe canceller (GSC) including canceling means 114 for outputting an object signal from the input signal outputted from the fixed beamforming section by removing the adaptive noise signal $C_a\vec{w}_a$ from the input signal $\vec{w}_q$. The adaptive beamformer 110 shown in FIG. 4 can be configured such that its structure is similar to that of the GSC of the related art. Detailed descriptions of the function and structure of the GSC will be omitted, since they are well-known. However, as a characteristic feature of the adaptive beamformer 110 according to an embodiment of the invention, the fixed beamforming section 111 is set such that it steers the input signal in at least two directions.

In addition, when the existing GSC is set to satisfy Formula 3, the constraints that the blocking matrix 112 produces in order to generate the noise reference signal according to an embodiment of the invention can be set to satisfy the following formula.

$$[C_1 \;\; C_2 \;\; \ldots \;\; C_N]^H\underline{w}=\underline{f} \quad \text{[Formula 13]}$$

$$C_i = \begin{bmatrix} \underline{a}(\theta_i) & \underline{0} & \cdots & \underline{0} \\ \underline{0} & \underline{a}(\theta_i) & \cdots & \underline{0} \\ \vdots & \vdots & \ddots & \vdots \\ \underline{0} & \underline{0} & \cdots & \underline{a}(\theta_i) \end{bmatrix}, \; i=1, \ldots , N$$

The fixed weight vector acquired by the fixed beamforming section 111 and the blocking matrix $C_a$ used by the blocking matrix 112 can be preset to designed values of the adaptive beamformer 110. Here, the fixed weight vector acquired by the fixed beamforming section 111 can be set so as to correspond to a plurality of beams which are formed according to an embodiment of the invention. Constraints C for acquiring the blocking matrix $C_a$ can be designed to be the constraints according to Formula 13.

In the case of the beamformer of the related art, the size of the constraint matrix C is defined as KJ*J. In contrast, the adaptive beamformer 110 having a plurality of beams (mainlobes) according to an embodiment of the invention is in the form of KJ*NJ, where N is the number of mainlobes. Therefore, an impulse response vector $\underline{f}$ can be designed in such a fashion that its size changes from J*1 to NJ*1 and impulse responses, each of which corresponds to each beam, vertically cascading each other.

The design values of the adaptive beamformer 110 are also accordingly modified. In particular, the size of an adaptive weight vector is designed to be (K−N)J*1. Accordingly, the size of the blocking matrix $C_a$ corresponding to the transform matrix of the weight vector can also be designed to be KJ*(K−N)J. This can be designed by subjecting the constraint matrix C to singular value decomposition, and taking the decomposed matrix by designed sizes in the order of the size of the singular values.

In general, in the case of the GSC with no constraints, the degree of freedom of the variable beamforming section 113 is equal to the number of sensors (microphones). If there are constraints, the degree of freedom becomes the number of the sensors (microphones)—the number of the constraints. This can be understood when the size of the adaptive weight vector in the above is considered. As the number of the constraints increases, the degree of freedom of the variable beamforming section 113 decreases, and the performance of the GSC is more deteriorated. Therefore, the number of beams that are actually available is limited by the number of the sensors (microphones). When the microphone array 200 is implemented using 4 sensors (microphones), the number of beams that are actually meaningful can be about 1 or 2. Accordingly, it is preferred that the microphone array 200 include 4 or more sensors (microphones).

In the meantime, the adaptive beamformer 110 according to an embodiment of the invention can use a self-tuning recursive least squares (RLS) algorithm in the adjustment of the adaptive noise signal, i.e. the adaptive weight vector, acquired by the variable beamforming section 113. Since the self-tuning RLS algorithm is an algorithm that has a fast adaption speed from among the adaptive algorithms, it is robust even to a non-stationary interference signal, and can rapidly adapt even after the look direction is changed.

The variable beamforming section 113 can acquire the adaptive weight vector using the self-tuning RLS algorithm, which can be an algorithm for recursively obtaining the solution of a least squares problem.

A description will be given below of a common case of the least squares problem.

A data matrix A and a desired signal $\vec{d}$ can be defined as follows:

$$A(n) = \begin{bmatrix} u(M) & u(M+1) & \ldots & u(N) \\ u(M-1) & u(M) & \ldots & u(N-1) \\ \vdots & \vdots & \ddots & \vdots \\ u(1) & u(2) & \ldots & u(N-M+1) \end{bmatrix} \quad \text{[Formula 14]}$$

$$\vec{d}(n) = [\, d(M) \;\; d(M+1) \;\; \ldots \;\; d(N) \,]^T \quad \text{[Formula 15]}$$

In addition, an optimum solution targeted in common adaptive signal processing satisfies the following condition.

$$A(n)\vec{w}(n)=\vec{d}(n) \quad \text{[Formula 16]}$$

In order to obtain the optimum solution that satisfies the condition as in Formula 16, the least squares problem can be defined as follows:

$$J(n)=\|\vec{d}(n)-A(n)\vec{w}(n)\|^2 \quad \text{[Formula 17]}$$

The optimum solution of the least squares problem which minimizes the foregoing cost function is generally given as follows:

$$\vec{w}(n)=(A^H(n)A(n))^{-1}A^H(n)\vec{d}(n) \quad \text{[Formula 18]}$$

This can be expressed by a time-averaged autocorrelation matrix Φ and a time-averaged cross-correlation vector Z as follows:

$$\vec{w}(n)=\Phi^{-1}(n)\vec{z}(n) \quad \text{[Formula 19]}$$

The RLS algorithm recursively obtains the solution, and the signal processing process is as follows:

$$\xi(n) = d(n) - \vec{w}^H(n-1)\vec{u}(n), \quad \text{[Formula 20]}$$

-continued $$\vec{k}(n) = \frac{P(n-1)\vec{u}(n)}{\lambda + \vec{u}^H(n)P(n-1)\vec{u}(n)},$$

$$\vec{w}(n) = \vec{w}(n-1) + \vec{k}(n)\xi^*(n),$$

$$P(n) = \lambda^{-1}\left(P(n-1) - \vec{k}(n)\vec{u}^H(n)P(n-1)\right)$$

Here, ξ(n) indicates a priori error, $\vec{k}(n)$ indicates a gain vector, and λ indicates a forgetting vector.

Therefore, $\vec{u}(n)$ in Formula 20 can correspond to an output signal from the blocking matrix 112, and the adaptive weight vector of the adaptive beamformer 110 according to an embodiment of the invention having the constraints of Formula 13 can be recursively obtained using Formula 20.

Figure 5:
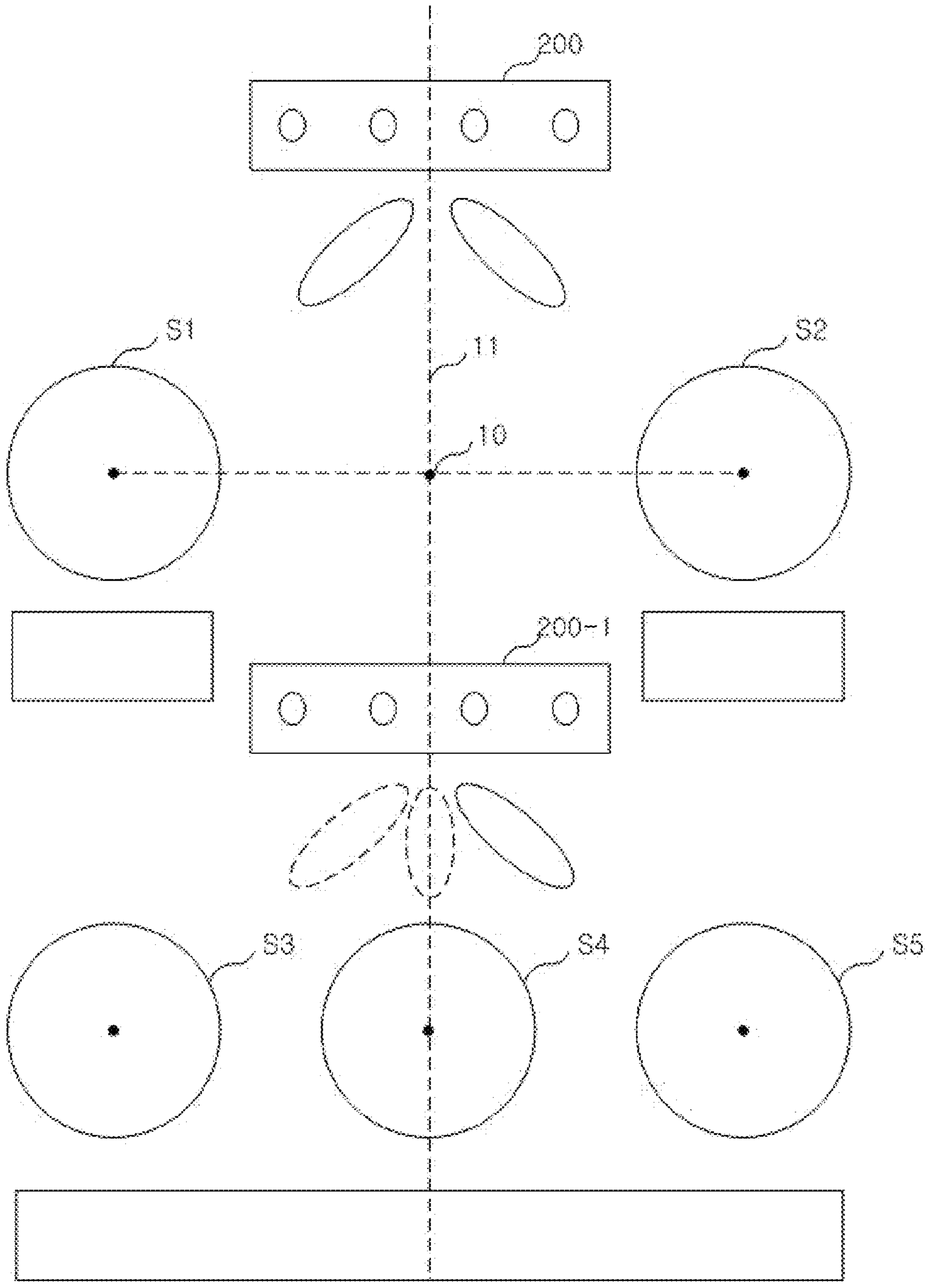
FIG. 5 is a view explaining a microphone array according to an embodiment of the invention and beams that are formed inside a vehicle by the microphone array.

FIG. 5 is a view explaining a microphone array according to an embodiment of the invention and beams that are formed inside a vehicle by the microphone array.

Referring to FIG. 5, the multi-beam sound system 1 according to an embodiment of the invention can include one or more microphone arrays 200 and 200-1. One microphone array 200 can form at least two beams, in which one beam can be formed in the direction facing toward the driver's seat S1, and the other beam can be formed in the direction facing toward the front seat S2 next to the driver's seat. Here, the directions of the beams can be determined by setting the value of θ in the constraints of Formula 13.

According to an embodiment of the invention, the microphone array 200 can be positioned on a vertical line 11 which are orthogonal to a line connecting predetermined seats (e.g. the seats S1 and S2) at a specific point 10. Among the plurality of beams formed by the microphone array 200, one beam can be formed on one side with respect to the vertical line 11, and the other beam can be formed on the other side with respect to the vertical line 11. Of course, when the microphone array 200 is positioned at a different point instead of being positioned at the specific point 10 on the vertical line 11 between the seats (e.g. the seats S1 and S2), the plurality of beams can be formed in the same direction.

In the meantime, the multi-beam sound system 1 can also include the second microphone array 200-1, which can also form a plurality of beams. In addition, according to an implementation, the second microphone array 200-1 can be configured such that it forms one beam and adaptively changes the direction of the beam.

When the second microphone array 200-1 forms a plurality of beams, the plurality of beams can be formed depending on the positions (e.g. S3, S4 and S5) of passengers seated in the rear seats.

Although FIG. 5 illustrates the case in which the microphone array 200 and the second microphone array 200-1 are positioned collinearly, a person having ordinary skill in the art can easily conceive that they are not necessarily configured as shown in FIG. 5.

The multi-beam sound system according to an embodiment of the invention can be embodied as computer readable codes that are stored in a computer readable record medium. The computer readable record medium includes all sorts of record devices in which data that are readable by a computer system are stored. Examples of the computer readable record medium include read only memory (ROM), random access memory (RAM), compact disc read only memory (CD-ROM), a magnetic tape, a hard disc, a floppy disc, an optical data storage device and the like. Further, the record medium may be implemented in the form of a carrier wave (e.g.

Internet transmission). In addition, the computer readable record medium may be distributed to computer systems over a network, in which the computer readable codes are stored and executed in a decentralized fashion. In addition, functional programs, codes and code segments for embodying the invention can be easily construed by programmers having ordinary skill in the art to which the invention pertains.

While the present invention has been described with reference to the certain exemplary embodiments which are shown in the drawings, it will be understood by a person having ordinary skill in the art that various modifications and equivalent other embodiments may be made therefrom. Therefore, the true scope of the present invention shall be defined by the technical principle of the appended claims.

INDUSTRIAL APPLICABILITY

The present invention is applicable to a sound system for a vehicle.

The invention claimed is:

1. A multi-beam sound system comprising:

a microphone array disposed at a predetermined position inside a vehicle, the microphone array comprising a plurality of microphones, and configured to generate an input signal; and an adaptive beamformer configured to form beams of the microphone array, wherein the adaptive beamformer forms at least two beams of the microphone array in different directions, wherein the beamformer comprising:

a fixed beamformer configured to process the input signal and generate a fixed beamformer output signal, in which beams are steered to at least two directions;

a blocking matrix configured to receive the input signal and to acquire a noise reference signal from the input signal;

a variable beamformer configured to acquire an adaptive noise signal from the noise reference signal; and a generalized sidelobe canceller (GSC) configured to output an object signal from the fixed beamformer output signal by removing the adaptive noise signal from the fixed beamformer output signal, and wherein the generalized side lobe canceller (GSC) is designed under constraints according to the following formula:

$$[C_1 \;\; C_2 \;\; \dots \;\; C_N]^H \underline{w} = \underline{f}$$

$$C_i = \begin{bmatrix} \underline{a}(\theta_i) & \underline{0} & \dots & \underline{0} \\ \underline{0} & \underline{a}(\theta_i) & \dots & \underline{0} \\ \vdots & \vdots & \ddots & \vdots \\ \underline{0} & \underline{0} & \dots & \underline{a}(\theta_i) \end{bmatrix}, \; i = 1, \dots, N,$$

where $C_i$ indicates an $i^{th}$ constraint matrix, $\underline{a}(\theta_i)$ indicates a steering vector, $\underline{w}$ is a weight vector matrix, and $\underline{f}$ indicates an impulse response that is intended, and N is number of mainlobes.

2. The multi-beam sound system according to claim 1, wherein the variable beamformer is configured to acquire the adaptive noise signal using a self-tuning recursive least squares (RLS) algorithm.

3. The multi-beam sound system according to claim 1, wherein the microphone array is disposed at a predetermined position corresponding to two seats from among seats provided inside the vehicle, wherein the predetermined position is situated on an orthogonal line which is orthogonal to a line connecting the two seats at a predetermined point between the two seats, at least one of the at least two beams is formed in a direction facing toward a seat which is positioned on one side with respect to the orthogonal line, and the other at least one of the at least two beams is formed in a direction facing toward a seat which is positioned on the other side with respect to the orthogonal line.

4. The multi-beam sound system according to claim 3, further comprising a second microphone array which is disposed so as to correspond to at least one seat from among the seats provided inside the vehicle except for the two seats.

5. The multi-beam sound system according to claim 4, further comprising a second adaptive beamformer, wherein the adaptive beamformer or the second adaptive beamformer is configured to form at least one beam of the second microphone array.

6. The multi-beam sound system according to claim 1, further comprising an echo remover is configured to remove an echo signal from the input signal when the echo signal based on a sound signal outputted from an audio-video-navigation (AVN) device of the vehicle is included in the input signal.

7. The multi-beam sound system according to claim 6, wherein the echo remover is configured to receive information about the sound signal from the audio-video-navigation (AVN) device, to store the received information about the sound signal, to estimate the echo signal based on the stored information about the sound signal, and to remove the estimated echo signal from the input signal.

8. A multi-beam sound system comprising:

a fixed beamformer configured to process an input signal from a microphone array and generate a fixed beamformer output signal, in which beams are steered: to at least two directions a blocking matrix configured to receive the input signal and acquires a noise reference signal from the input signal;

a variable beamformer configured to acquire an adaptive noise signal from the noise reference signal; and a generalized sidelobe canceller (GSC) configured to output an object signal from the fixed beamformer output signal by removing the adaptive noise signal from the fixed beamformer output signal, wherein the generalized side lobe canceller (GSC) is designed under constraints according to a following formula in order to steer the beams to at least two directions:

$$[C_1 \;\; C_2 \;\; \dots \;\; C_N]^H \underline{w} = \underline{f}$$

$$C_i = \begin{bmatrix} \underline{a}(\theta_i) & \underline{0} & \dots & \underline{0} \\ \underline{0} & \underline{a}(\theta_i) & \dots & \underline{0} \\ \vdots & \vdots & \ddots & \vdots \\ \underline{0} & \underline{0} & \dots & \underline{a}(\theta_i) \end{bmatrix}, \; i = 1, \dots, N,$$

where $C_i$ indicates an $i^{th}$ constraint matrix, $\underline{a}(\theta_i)$ indicates a steering vector, $\underline{w}$ is a weight vector matrix, and $\underline{f}$ indicates an impulse response that is intended, and N is number of mainlobes.

* * * * *